United States Patent [19]

Lemmons

[11] Patent Number: 4,763,914
[45] Date of Patent: Aug. 16, 1988

[54] FOLDING MOTORCYCLE TRANSPORT TRAILER

[76] Inventor: Albert G. Lemmons, P.O. Box 41001, Nashville, Tenn. 37204

[21] Appl. No.: 66,330

[22] Filed: Jun. 25, 1987

[51] Int. Cl.$^4$ ............................................. B62D 53/04
[52] U.S. Cl. .................................... 280/401; 280/492; 280/493; 280/402
[58] Field of Search ............... 280/401, 402, 204, 492, 280/493, 494

[56] References Cited

U.S. PATENT DOCUMENTS

| | | |
|---|---|---|
| 2,988,382 | 6/1961 | Holland . |
| 2,995,399 | 8/1961 | Riseborough . |
| 3,625,545 | 12/1971 | Somers . |
| 3,989,264 | 11/1976 | Lovendahl ........................ 280/401 |
| 3,997,186 | 12/1977 | Pottorff ............................ 280/494 |
| 4,362,316 | 12/1982 | Wright . |
| 4,488,735 | 12/1984 | Hehr . |
| 4,490,089 | 12/1984 | Welker . |
| 4,511,181 | 4/1985 | Schantz . |
| 4,529,220 | 7/1985 | Wright . |

Primary Examiner—John J. Love
Assistant Examiner—Donn McGiehan
Attorney, Agent, or Firm—Fleit, Jacobson, Cohn & Price

[57] ABSTRACT

A trailer is provided including an elongated longitudinally extending frame incorporating longitudinally aligned and extending front and rear frame sections pivotally secured together at adjacent ends for free relative angular displacement about a horizontal transverse axis. The front end of the front frame section includes coupling structure for coupling the frame to a towing vehicle and the rear frame section includes a transverse axle assembly mounted from the rear frame section centrally intermediate its opposite ends and having a pair of opposite side ground engaging support wheels journalled therefrom. Further, the rear frame section includes structure for support and cradling the lower periphery of the rear wheel of a motorcycle in position rearward of the axle assembly and the front frame section of the trailer includes motorcycle front wheel supporting and cradling structure supported therefrom for adjustable shifting longitudinally of the front frame section.

8 Claims, 2 Drawing Sheets

U.S. Patent    Aug. 16, 1988    Sheet 1 of 2    4,763,914
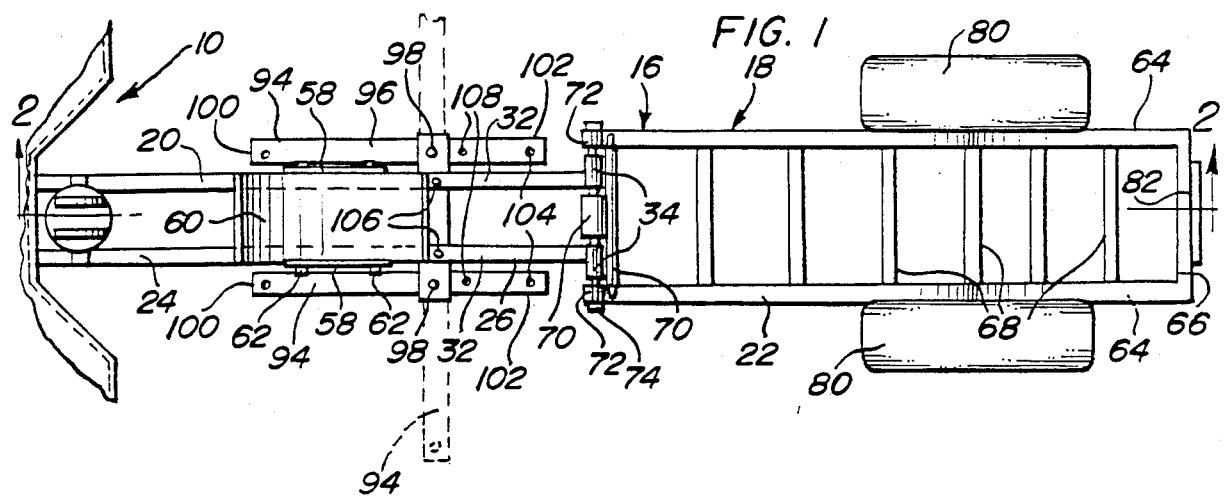
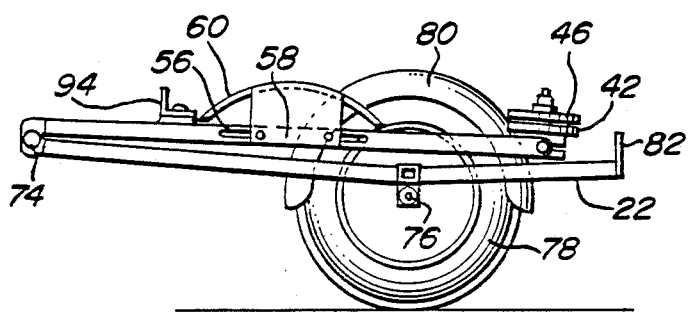
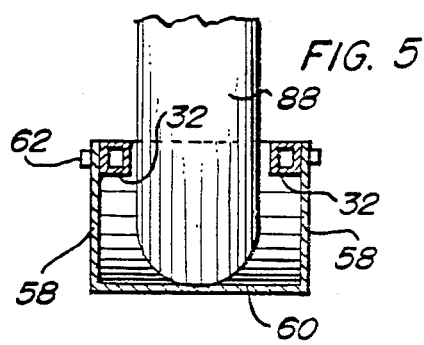
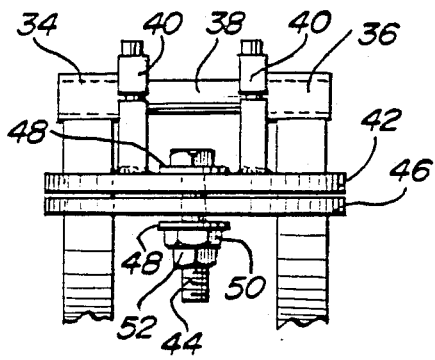
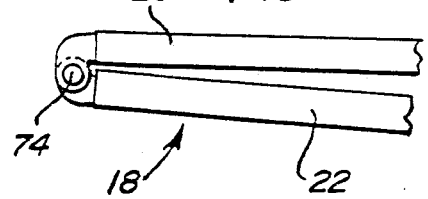

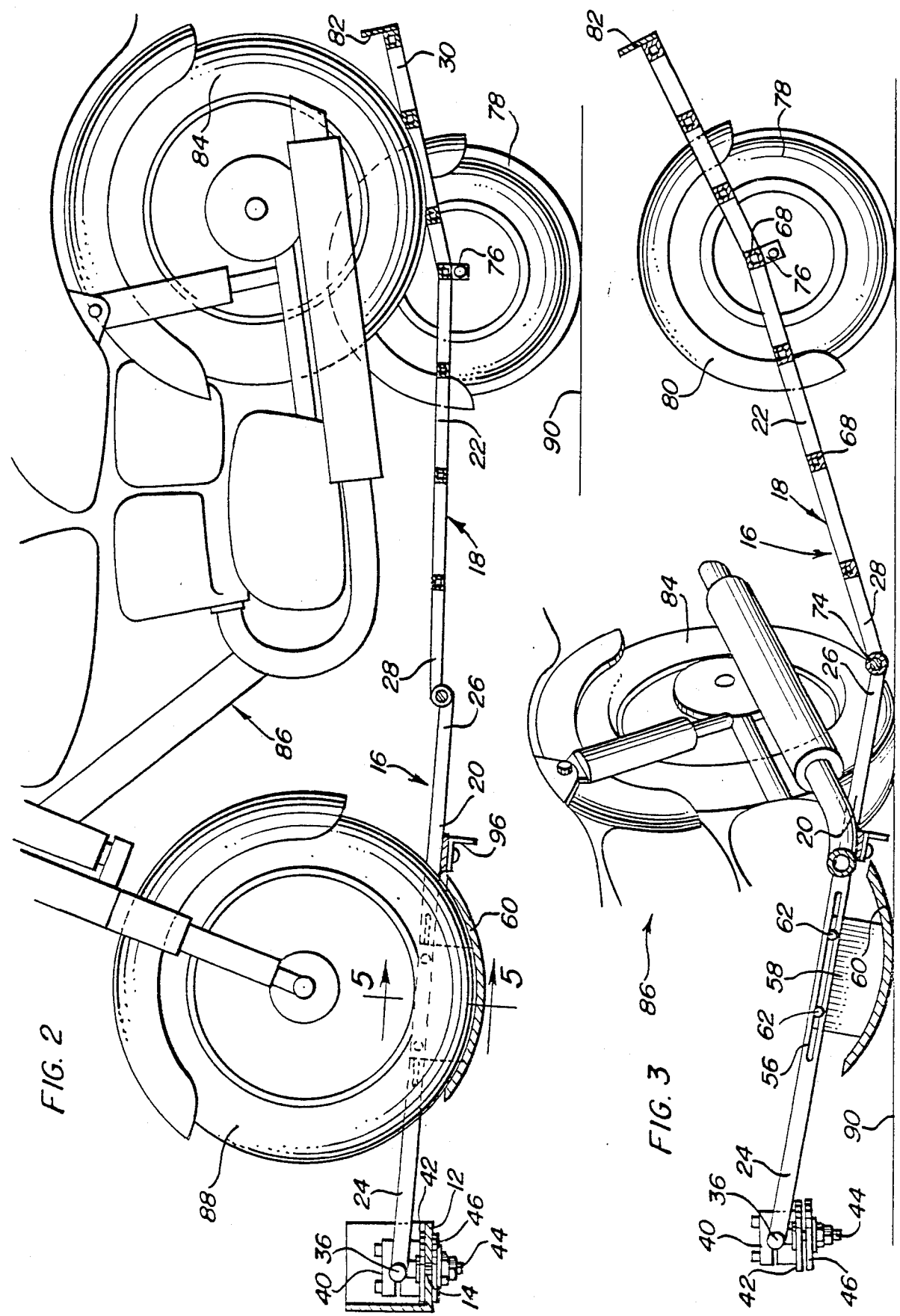

FOLDING MOTORCYCLE TRANSPORT TRAILER

BACKGROUND OF THE INVENTION

1. Field of the Invention

Motorcycle trailers are often used to recover motorcycles which have been disabled, to transport motorcycles to or from distant locations and to transport motorcycles to and/or from motorcycle repair facilities.

In substantially all of these instances, a motorcycle is supported from the trailer in one direction of travel, but in the other direction of the travel there is no motorcycle to support from the trailer. Accordingly, the motorcycle trailer, which is extremely low in elevation, cannot be readily seen by adjacent motorists. In addition, driving a vehicle with a trailer unnecessarily coupled behind the vehicle necessitates more caution and generates more driving difficulties than when a vehicle without a trailer coupled thereto is being driven.

Accordingly, a need exists for a motorcycle trailer which is of lightweight construction and which may be manipulated into a compact state for storage within the luggage compartment of a conventional vehicle when the trailer is not being used to support a motorcycle.

2. Description of Related Art

Various different forms of lightweight foldable trailers and other trailers including some of the general structural and operational features of the instant invention are disclosed in U.S. Pat. Nos. 2,988,382, 2,995,399, 3,625,545, 4,362,316, 4,488,735, 4,490,089, 4,511,181 and 4,529,220.

However, these previously known forms of trailers do not include the overall combination of structural features of the instant invention, nor are they operable in the improved manner in which the trailer of the instant invention functions.

SUMMARY OF THE INVENTION

The motorcycle trailer of the instant invention is of lightweight construction and is constructed in a manner whereby a narrow longitudinal frame is provided incorporating longitudinally extending and aligned front and rear frame sections pivotally interconnected at adjacent ends for relative angular displacement about a horizontal transverse axis. An intermediate length portion of the rear frame section includes opposite side ground engaging support wheels and an intermediate length portion of the front frame section includes motorcycle front wheel and positioning structure adjustably positionable longitudinally of the front frame section. The rear frame section includes a motorcycle rear wheel support and positioning structure which is stationary and disposed rearward of the horizontal transverse axis about which the rear opposite side ground engaging wheels are journalled. The front end of the front frame section includes coupling structure supported therefrom for angular displacement about a horizontal transverse axis and the coupling structure includes a depending shank whereby the coupling structure may be mounted from a tow hitch portion or the like for angular displacement about a vertical axis.

The pivotal connection between the front and rear sections of the trailer frame comprises a "free" pivotal connection that allows relative angular displacement of the front and rear frame sections, even when a motorcycle is supported from the trailer and being trailed behind a towing vehicle.

This free pivot connection enables the motorcycle to be moved onto the trailer and removed therefrom either from the rear end of the trailer or from the intermediate length portion of the trailer defining the pivot connection between the front and rear frame sections. This feature of the trailer of the instant invention is believed to be totally unique.

The main object of this invention is to provide a collapsible motorcycle trailer of lightweight construction which may be folded into a compact state and stored within the luggage compartment of a conventional vehicle when it is not necessary to trail a motorcycle behind the vehicle.

Still another object of this invention is to provide a lightweight motorcycle trailer constructed in a manner whereby the motorcycle front and rear wheel supporting and positioning structure carried by the trailer may be adjusted longitudinally of the trailer relative to each other to thereby adapt the trailer for transporting motorcycles having different wheel bases.

Yet another object of this invention is to provide a motorcycle trailer in accordance with the preceding objects and including collapsible outrigger-type anchors for anchoring a motorcycle in upright position relative thereto.

Still another object of this invention is to provide a lightweight motorcycle trailer including coupling structure for coupling the trailer to a tow point on an associated vehicle and with the coupling structure enabling relative steering angulation of the towing vehicle and trailer and yet being operative to maintain the trailer in upright position relative to the towing vehicle.

A final object of this invention to be specifically enumerated herein is to provide a lightweight motorcycle trailer in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of a motorcycle trailer constructed in accordance with the present invention and with the forward end of the trailer coupled to a step bumper of a towing vehicle;

FIG. 2 is an enlarged fragmentary longitudinal vertical sectional view taken substantially upon the plane indicated by the section line 2—2 of FIG. 1 and with an attendant motorcycle fragmentarily illustrated as supported from the trailer;

FIG. 3 is a vertical sectional view similar to FIG. 2 but illustrating the manner in which the longitudinal mid-portion of the frame of the trailer may be lowered relative to the ground in order to load the associated motorcycle onto the trailer centrally intermediate the opposite ends thereof;

FIG. 4 is a side elevational view of the trailer in a collapsed position;

FIG. 5 is an enlarged transverse vertical sectional view taken substantially upon the plane indicated by the section line 5—5 of FIG. 2;

FIG. 6 is an enlarged fragmentary front end elevational view of the trailer as seen from the left side of FIG. 3; and FIG. 7 is an enlarged fragmentary side elevational view of the left hand portion of FIG. 4.

DESCRIPTION OF THE PREFERRED EMBODIMENT

Referring now more specifically to the drawings, the numeral 10 generally designates a step bumper carried by the rear of a towing vehicle and including a horizontal flange portion 12 through which a vertical bore 14 is formed.

The trailer of the instant invention is referred to in general by the reference numeral 16 and includes a longitudinal frame referred to in general by the reference numeral 18 incorporating longitudinally extending and aligned front and rear frame sections 20 and 22. The frame section 20 includes a front end 24 and a rear end 26 while the frame section 22 includes a front end 28 and a rear end 30.

The front section 20 includes a pair of opposite side elongated members 32 having transverse sleeve portions 34 at their rear ends and similar outer end capped transverse sleeve members 36 at their forward ends. The opposite ends of a front transverse pivot shaft 38 are rotatably received in the sleeve members 36 and a pair of clamp mounts 40 mount a first circular mounting plate 42 to the pivot shaft 38. The first mounting plate 42 is centrally apertured and receives a mounting bolt 44 therethrough and the mounting bolt 44 also passes through the center aperture in a second mounting plate 46. The mounting bolt 44 is provided with a pair of washers 48 on the remote sides of the plates 42 and 46 and has a first nut 50 threadedly engaged thereon as well as a second jam nut 52 threadedly engaged thereon.

The longitudinal mid-portions of the opposite side elongated members 32 are longitudinally slotted as at 56 and opposite side mounting plate portions 58 of a front wheel cradle 60 are anchored relative to the slotted portions of the opposite elongated members 32 by fasteners 62 secured through the mounting plate portions 58 and the slots 56 in the opposite side members 32. Accordingly, the cradle 60 constitutes a brace between the opposite side members 32 and may be adjustably shifted longitudinally thereof.

The rear section 22 of the frame 18 includes opposite side elongated members 64 rigidly interconnected at their rear ends by a rear transverse brace 66 and at points spaced longitudinally therealong by additional transverse braces 68. A forward transverse brace 70 is secured between the forward ends of the opposite side elongated members 64 and includes a sleeve member 72 supported therefrom with which the sleeve portions 34 are registrable and registered with additional sleeve members 72 carried by the forward ends of the opposite side elongated members 64. An elongated fastener-type pivot shaft 74 passes through the sleeve portions 34 and the sleeve members 70 and 72 and thereby serves to pivotally connect the rear end 26 of the front section 20 to the front end 28 of the rear section 22.

A transverse axle assembly 76 underlies and is supported from one of the additional transverse brace members 68 of the rear section 22 and a pair of opposite side wheels 78 are journalled from the opposite ends of the axle assembly 76, opposite side fenders 80 for the wheels 78 being carried by the outer sides of corresponding opposite elongated members 64 in any convenient manner (not shown). The rear transverse brace 66 includes an upstanding plate 82 supported therefrom and the spacing between the two transverse brace members 68 disposed between the axle assembly 76 and the plate 72 defines a rear wheel support and cradle for the rear wheel 84 of a motorcycle referred to in general by the reference numeral 86, the front wheel 88 of the motorcycle 86 being received in and supported from the front wheel cradle 60.

From FIG. 4 of the drawings it may be seen that the sleeve portions 34 and sleeve members 70 and 72 are offset relative to the medial planes of the front and rear sections 20 and 22 so that the front section 20 may be folded upwardly, rearwardly and downwardly into position closely overlying the upper surface of the rear section 22. Thus, the trailer 16 may be conveniently folded for compact storage.

In operation, the trailer 16 may have the cradle 60 disposed on the ground 90 in the manner illustrated in FIG. 3 of the drawings and with the longitudinal mid-portion of the trailer 16 at least substantially resting upon the ground. In this manner, the rear wheel 84 of the motorcycle 86 may be rolled rearwardly onto the longitudinal mid-portion of the frame 18 and rearwardly upwardly along the rear section 22 until the rear wheel 84 is disposed generally over the axle assembly 86. Then, the front fork of the motorcycle 86 is turned so as to engage the rear periphery of the front wheel 88 of the motorcycle 86 with the front frame section 20 in order that continued rearward movement of the motorcycle 86 on the trailer 16 will cause the front wheel 88 to roll up onto the frame section 20 substantially at the cradle 60 whereupon the front wheel 88 may be allowed to drop into the cradle 60.

Of course, the cradle 60 is adjusted longitudinally of the front section 20 so as to position the rear wheel 84 rearward of the axle assembly 76 and with the lower periphery of the rear wheel 84 cradled between the corresponding additional transverse brace members 68 of the rear section 20, see FIG. 2. Thereafter, the motorcycle 86 may be strapped in upright position on the trailer 16.

In order to strap the motorcycle 86 in upstanding position on the trailer 16, a pair of swingably retractable opposite side anchor arms 94 have their base ends 96 pivotally supported as at 98 from the opposite ends of a transverse member 99 secured beneath the elongated members 32 as at 98 and include apertured outer ends 100 as well as apertured inner end extensions 102. When the arms 94 are swung to their retracted positions illustrated in FIG. 1, the trailer may of course be compactly folded in the manner illustrated in FIG. 4. However, in order to strap the motorcycle 86 in upright position relative to the trailer 16, the anchor arms 94 are swung to positions disposed substantially normal to the longitudinal extent of the frame 18 with each of the apertured inner end extensions underlying and removably pinned to the opposite elongated member 32 through the utilization of removable pins (not shown) secured through the apertures 104 formed in the free ends of the extensions 102, corresponding apertures 106 formed in the elongated members 32 and inner end apertures 108 formed in the extensions 102. Accordingly, each of the aforementioned pins (not shown) locks each of the anchor arms 94 in position relative to the corresponding opposite side elongated member 32.

After the anchor arms 94 have been secured in position, suitable strap means (not shown) may be secured between the outer ends of the anchor arm 94 and the front fork or forward frame portion of the motorcycle 86. Thereafter, the front end 24 of the front section 20 may be raised and the bolts 50 and 52, the lower washer 48 and the second mounting plate 46 may be removed from the bolt 44 and the latter may be downwardly inserted through the vertical bore 14 formed in the flange portion 12 so that the first mounting plate 42 overlies the flange portion 12. Thereafter, the second mount plate 46 is slipped upwardly over the lower end of the mounting bolt 44 and followed by the washer 48, the nut 50 and the jam nut 52. The plates 42 and 46 thus guidingly engage the upper and lower surfaces of the flange portion 12 to prevent tilting of the trailer 16 when it is being trailed behind the vehicle 10 with the motorcycle 86 mounted on the trailer 16.

Of course, when it is desired to unload the motorcycle 86, it is merely necessary to lift front wheel 88 out of the cradle 60, to displace the front wheel 88 to one side of the front section 20 and to thereafter lower the front wheel 88 to the ground 90. Then, the motorcycle may be rolled forwardly in a turn outwardly away from the front section 20 so that the rear wheel 84 of the motorcycle 86 may be rolled from the side of the rear section 22.

Although the rear of the frame 18 includes the upstanding plate 82, the motorcycle 86 may be loaded from the rear end of the frame 18 in the conventional manner, the plate 82 not being excessively high.

With attention now invited more specifically to FIG. 2 of the drawings, because the weight of the rear wheel 84 of the motorcycle 86 is disposed rearward of the axle assembly 76, the pivot connection at the bolt or fastener 74 does not drop toward the ground 90. Rather, the front and rear sections 20 and 22 of the frame 18 assume the substantially horizontally aligned positions thereof illustrated in FIG. 2. Thus, additional means to maintain the pivot connection at the bolt or fastener 74 are not needed, although such means may be provided if desired.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is:

1. A motorcycle trailer including a longitudinal main frame incorporating elongated, longitudinally extending end aligned front and rear frame sections with the rear end of said front section pivotally connected to the front end of said rear section for free relative angulation of said sections about a first horizontal transverse axis, said rear section including opposite side ground engaging wheels journalled therefrom for rotation about a second horizontal transverse axis disposed centrally intermediate the front and rear ends of said rear frame section, first motorcycle front wheel support and positioning means carried by said front frame section centrally intermediate the front and rear ends thereof for support of a motorcycle front wheel from said front frame section, motorcycle rear wheel support and positioning means carried by said rear section rearward of said second horizontal axis and coupling means pivotally mounted from said front end of said front section for oscillation relative thereto about a third horizontal axis extending transversely of said front section, said coupling means including a mounting portion mountable relative to a towing vehicle for oscillation relative thereto about an upstanding axis disposed generally normal to said third axis, inwardly swingably retractable laterally outwardly projecting opposite side anchor arms pivotally supported from opposite side longitudinal mid-portions of said front section for angular displacement relative thereto about upstanding axes and including outer ends to which anchor straps may be secured.

2. The trailer of claim 1 wherein said first motorcycle front support and positioning means includes an upwardly opening cradle member mounted from said front section for adjusted shifting longitudinally therealong and in which cradle member the lower peripheral portion of a motorcycle front wheel may be cradled.

3. The trailer of claim 1 wherein said mounting portion includes a vertical mounting shank defining said upstanding axis relative to which said coupling means is angularly displaceable.

4. The trailer of claim 3 wherein said coupling means includes a circular plate through the center of which said mounting shank extends and adapted to overlie the upper surface of an apertured horizontal flange portion of a towing vehicle through which said mounting shank may extend, and a second circular plate having a central opening formed therein through which said shank extends and is secured for underlying said horizontal flange portion.

5. The trailer of claim 1 wherein said anchor arms and front section include means for releasably anchoring said anchor arms in outward projecting extended positions against angular displacement relative to said front section toward inwardly swung retracted positions.

6. The trailer of claim 5 wherein said mounting portion includes a vertical mounting shank defining said upstanding axis relative to which said coupling means is angularly displaceable.

7. The trailer of claim 6 wherein said coupling means includes a circular plate through the center of which said mounting shank extends and adapted to overlie the upper surface of an apertured horizontal flange portion of a towing vehicle through which said mounting shank may extend, and a second circular plate having a central opening formed therein through which said shank extends and is secured for underlying said horizontal flange portion.

8. The trailer of claim 1 said rear section includes a pair of opposite side elongated frame members between which a plurality of transverse brace members extend and are secured, said brace members being laterally spaced apart longitudinally of said rear frame section, said rear wheel support and positioning means comprising one adjacent pair of said transverse brace members of said rear frame section between which the lower periphery of the rear wheel of a motorcycle may be cradled.

* * * * *